(12) United States Patent
Liang et al.

(10) Patent No.: US 8,855,135 B2
(45) Date of Patent: Oct. 7, 2014

(54) METHOD AND SYSTEM FOR PROCESSING SESSION INITIATION PROTOCOL MESSAGES

(75) Inventors: Zhi Yong Liang, Beijing (CN); Ling Shao, Beijing (CN); Wei Xue, Beijing (CN); Bo Yang, Beijing (CN); Yi Xin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 12/052,832

(22) Filed: Mar. 21, 2008

(65) Prior Publication Data

US 2008/0232392 A1     Sep. 25, 2008

(30) Foreign Application Priority Data

Mar. 23, 2007 (CN) .......................... 2007 1 0089480

(51) Int. Cl.
- *H04L 12/403* (2006.01)
- *H04L 29/06* (2006.01)
- *H04L 29/08* (2006.01)

(52) U.S. Cl.
CPC .............. *H04L 65/105* (2013.01); *H04L 69/08* (2013.01); *H04L 29/06197* (2013.01); *H04L 69/327* (2013.01); *H04L 65/80* (2013.01); *H04L 65/1006* (2013.01); *H04L 69/12* (2013.01)
USPC ....................................................... 370/450

(58) Field of Classification Search
USPC ............ 370/389, 328, 450; 709/230; 470/450
See application file for complete search history.

(56) References Cited

U.S. PATENT DOCUMENTS

| | | | |
|---|---|---|---|
| 6,807,173 B1 | 10/2004 | Lee | |
| 7,688,714 B2 * | 3/2010 | Nalawade et al. | 370/217 |
| 2003/0036966 A1 * | 2/2003 | Amra et al. | 705/26 |
| 2004/0162032 A1 | 8/2004 | Li | |
| 2004/0254905 A1 * | 12/2004 | Tiku | 706/55 |
| 2006/0083246 A1 * | 4/2006 | Minami et al. | 370/395.31 |

(Continued)

FOREIGN PATENT DOCUMENTS

WO   WO2005/011175   3/2005

OTHER PUBLICATIONS

Nimmelapelli, Raja, "FPGA Implementation of a SIP Message Protocol", N.C. State University, 2006.

(Continued)

*Primary Examiner* — Chirag Shah
*Assistant Examiner* — Majid Esmaeilian
(74) *Attorney, Agent, or Firm* — William Stock; Anne Vachon Dougherty

(57) ABSTRACT

A method and system for processing session initiation protocol messages including receiving a session initiation protocol message by a front end, parsing the session initiation protocol message by the front end, grouping the token types and the token contents in the session initiation protocol message respectively, and setting up corresponding links between the token types and the token contents, wherein the session initiation protocol message, after parsing, is transformed to the session initiation protocol offload engine message with a session initiation protocol offload engine message header part, for storing message level information, a token type part, for storing token type information, wherein it comprises a plurality of fixed-length entries, and a token content part for storing token contents, wherein it comprises a plurality of variable-length entries, and processing the transformed session initiation protocol offload engine message at the server end.

SOE Architecture

16 Claims, 7 Drawing Sheets

(56) References Cited

U.S. PATENT DOCUMENTS

| | | | |
|---|---|---|---|
| 2006/0268857 A1* | 11/2006 | Bessis et al. | 370/389 |
| 2007/0094374 A1* | 4/2007 | Karia et al. | 709/223 |
| 2008/0126541 A1* | 5/2008 | Rosenberg et al. | 709/225 |
| 2008/0205330 A1* | 8/2008 | Stadler et al. | 370/328 |

OTHER PUBLICATIONS

Wu, Jian Jun, et al, Lightweight SIP/SDP Comression Scheme (LSSCS), Proceedings of SPIE, vol. 4586, pp. 67-76, 2001.

* cited by examiner

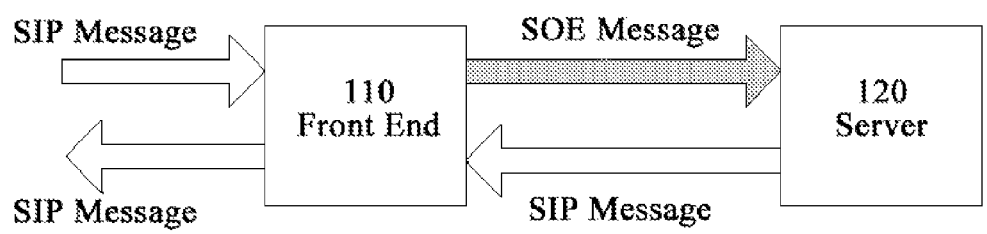
FIG. 1  SOE Architecture
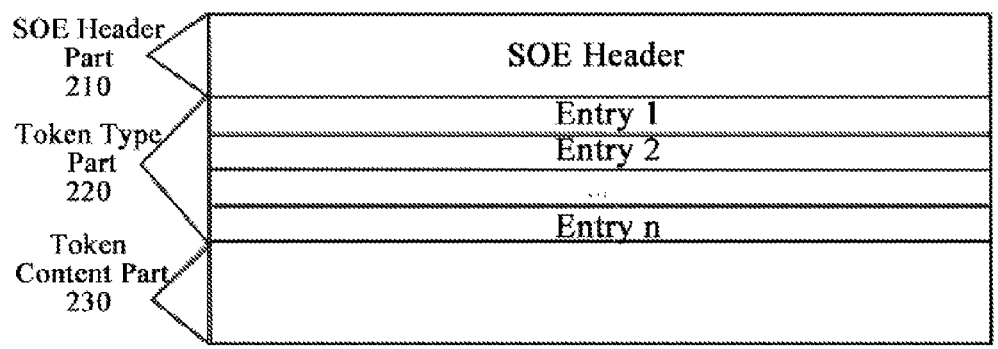
FIG. 2  Overall Structure of SOE Message

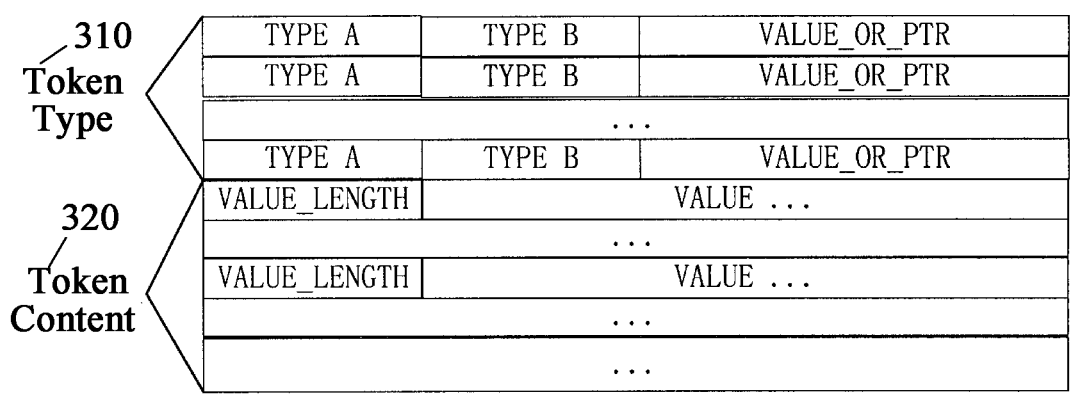
FIG. 3  Data Structure of SOE Message

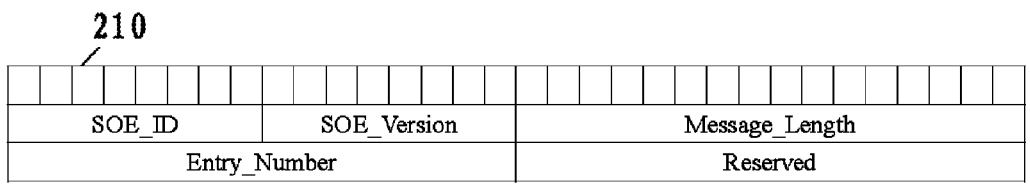
FIG. 5A SOE Header Part
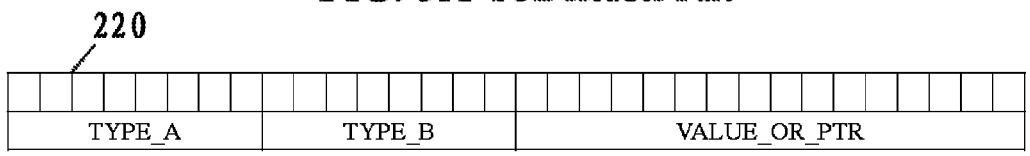
FIG. 5B Encoding for Token Type Part
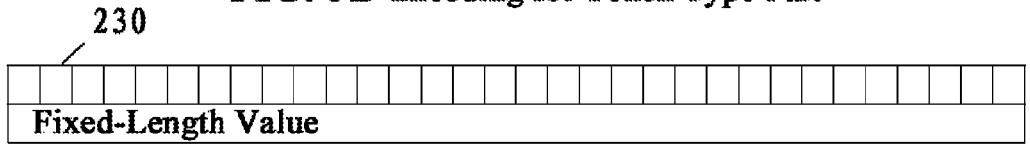
FIG. 5C
Encoding for Fixed-Length Value in Token Content Part
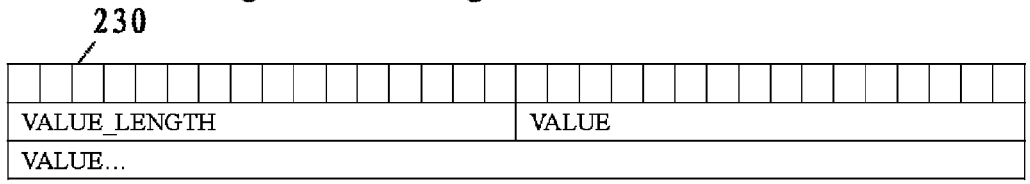
FIG. 5D
Encoding for Variable-Length Value in Token Content Part

METHOD AND SYSTEM FOR PROCESSING SESSION INITIATION PROTOCOL MESSAGES

TECHNICAL FIELD OF THE INVENTION

The invention generally relates to the field of data communication, and particularly, relates to a method and system for processing SIP (Session Initiation Protocol) messages, and more particularly, relates to a method and system for binarizing SIP messages to reduce the load of SIP server (abbreviated as offload hereinbelow) and benefit for selectively processing SIP messages.

BACKGROUND OF THE INVENTION

One foundational session control protocol is becoming an emerging workload in the telecom Next-Generation-Network (NGN) and IT collaborative solution. SIP is one text-based message protocol. It operates independently of the underlying network transport protocols, establishing sessions between multiple users irrespective of whether the transferred data is text data, audio data, or video data. In the SIP protocol stack, however, some computation-intensive operations, such as token parsing and security processing, will occupy a large amount of CPU cycles. As SIP-based applications are becoming popular, these operations could be potential performance bottlenecks for SIP servers, such as proxy servers or application servers.

To address this, SIP Offload Engine (SOE) architecture is proposed. As shown in FIG. 1, a front end 110 parses a SIP message, binarizes it, and generates an "SIP Offload Engine (SOE) message", abbreviated as SOE message hereinbelow. The objective of applying such offload technology is to offload the computation-intensive operations from the server end to some special appliances, such as front ends. In particular, the front end will parse the tokens in the SIP message, and transform the text-based message to a binary SOE message, and then the server will parse the SOE message. The term "token" is defined as an indecomposable part provided to an upper-layer logic through an interface, which is a character string separated by separators, such as semicolons, spaces. Thus, at server end more CPU cycles may be freed up for upper-layer applications to improve the overall performance.

The SIP protocol enables end users to communicate with each other via messages. The basic form of a message could either be a request sent from a client to a server or a reply from the server to the client. A message consists of a start-line, one or more header fields, a null line indicating the end of the header fields, and an optional message-body. The generic structure of an SIP message is shown as below:

```
generic-message = start-line
    message header field 1
    message header field 2
    ...
    ...
    CRLF
    message-body [optional]
    start-line = Request-Line/Status-Line
```

1. SIP Request Message

A request may be recognized by the presence of a Request-Line as the start-line. The format of a request-line is shown as below:

Request-Line=Method SP Request-URI SP SIP-Version CRLF

A method is an action associated with a session between end users. The examples of a method comprise: REGISTER, INVITE, OPTIONS, ACK, CANCEL, BYE, defined in RFC3261 specification; and other methods defined in other separate RFC specifications. The Request-URI is the recipient of the SIP message. The SIP Version is currently SIP/2.0 and is to be included in all messages. The CRLF terminates the Request-Line.

2. SIP Response Message

A response may be recognized by the presence of a Status-Line as the start-line. The format of a status-line is shown as below:

Status-Line=SIP-Version SP Status-code SP Reason-Phrase CRLF

The Status-Code represents the result of the action taken due to the request. The result of a request is categorized below:

(a) 100-199: A request was received, processed in progress.
(b) 200-299: The request was received, understood, and accepted.
(c) 300-399: Further action needs to be taken to complete the processing of the request.
(d) 400-499: The request cannot be processed at the server, possibly due to bad syntax.
(e) 500-599: The server failed to process the request. The request could have been invalid.
(f) 600-699: Global failure. The request cannot be processed by any server. The Reason-Phrase is an English-like equivalent of the Status-Code. For example, for Status-Code 200, the Reason-Phrase is "OK".

Both the Request/Response messages may have multiple message headers. These SIP header fields form a part of the SIP message. Each header conveys some information for the destination. The format of an SIP message header is shown as below:

field-name: [field-value]

It is noted that the field value could extend over multiple lines.

The type of a header field can be thought of to be based on the function performed by that header. 44 types of headers are defined in RFC3261 specification. The major header types comprise, but not limit to:

1. Originator fields: From, To
2. Routing fields: Via
3. Authentication: Proxy-Authenticate It can be seen from above that an SIP message has the following three features: a) a large number of token values with variable lengths; b) line-by-line structure; and c) multiple tokens in each line. Therefore, how to binarize SIP messages is critical for the implementation of the offload technology.

As one of the existing approaches, ASN.1 can be used for accommodating the token information in a way of <Type, Length, Value> (TLV). But this TLV approach is not efficient since most of the values in an SIP message are strings with variable lengths, then the parser will have to go through the whole message to get the information needed.

Another existing approach is to allocate a fixed position for each token. But this approach also has multiple defects. First, the storage efficiency is affected, as there will be waste storage space between tokens with different lengths. Second, the blank storage space must be skipped while processing messages, which also affects the processing efficiency. Third, there is no sufficient space reserved for "optional" tokens.

Therefore, there is a need for an approach to binarize an SIP message efficiently.

SUMMARY OF THE INVENTION

The invention is proposed in order to solve the above problems. According to one aspect of the invention, a method for processing session initiation protocol messages is proposed, comprising the following steps:

receiving a session initiation protocol message by a front end;

parsing the session initiation protocol message by the front end, grouping the token types and the token contents in the session initiation protocol message respectively, and setting up corresponding links between the token types and the token contents, wherein the session initiation protocol message, after parsing, is transformed to the session initiation protocol offload engine message with the following three parts: a session initiation protocol offload engine message header part, for storing message level information; a token type part, for storing token type information, wherein it comprises a plurality of fixed-length entries; and a token content part, for storing token contents, wherein it comprises a plurality of variable-length entries; and processing the transformed session initiation protocol offload engine message at the server end.

According to another aspect of the invention, a system for processing session initiation protocol messages is proposed, comprising:

a front end, which comprises a message parser;

a server, which comprises a message processing means;

wherein, a session initiation protocol message is received by the front end;

the session initiation protocol message is parsed by the message parser, the token types and the token contents in the session initiation protocol message are grouped respectively, and corresponding links are set up between the token types and the token contents, the session initiation protocol message, after parsing, is transformed to the session initiation protocol offload engine message with the following three parts: a session initiation protocol offload engine message header part, for storing message level information; a token type part, for storing token type information, wherein it comprises a plurality of fixed-length entries; and a token content part, for storing token contents, wherein it comprises a plurality of variable-length entries; and the transformed session initiation protocol offload engine message is processed by the message processing means.

According to still another aspect of the invention, there is provided a program product embodied in a computer readable medium comprising computer executable program code for performing steps of the above method.

The method and system for binarizing SIP messages for offload and selective processing proposed by the present invention transform text-based SIP messages to binary-based SOE messages efficiently and rapidly, thereby significantly reducing the working load of the server while taking the storage efficiency into account.

BRIEF DESCRIPTION OF THE DRAWINGS

The invention itself and its preferred mode, together with further objects and advantages, will be best appreciated from the reading of the following detailed description of the illustrative embodiments taken in conjunction with the drawings, in which:

FIG. 1 illustrates an illustrative diagram of the SOE architecture;

FIG. 2 illustrates an illustrative diagram of the overall structure of an SOE message according to a preferable embodiment of the invention;

FIG. 3 illustrates the data structure of an SOE message according to a preferable embodiment of the invention;

FIG. 5A illustrates an illustrative diagram of the SOE header part according to a preferable embodiment of the invention;

FIG. 5B illustrates an illustrative diagram of the token type part according to a preferable embodiment of the invention;

FIG. 5C illustrates an illustrative diagram of the encoding for the fixed-length value in the token content part according to a preferable embodiment of the invention;

FIG. 5D illustrates an illustrative diagram of the encoding for the variable-length value in the token content part according to a preferable embodiment of the invention;

DETAILED DESCRIPTION OF THE INVENTION

Figure 4:
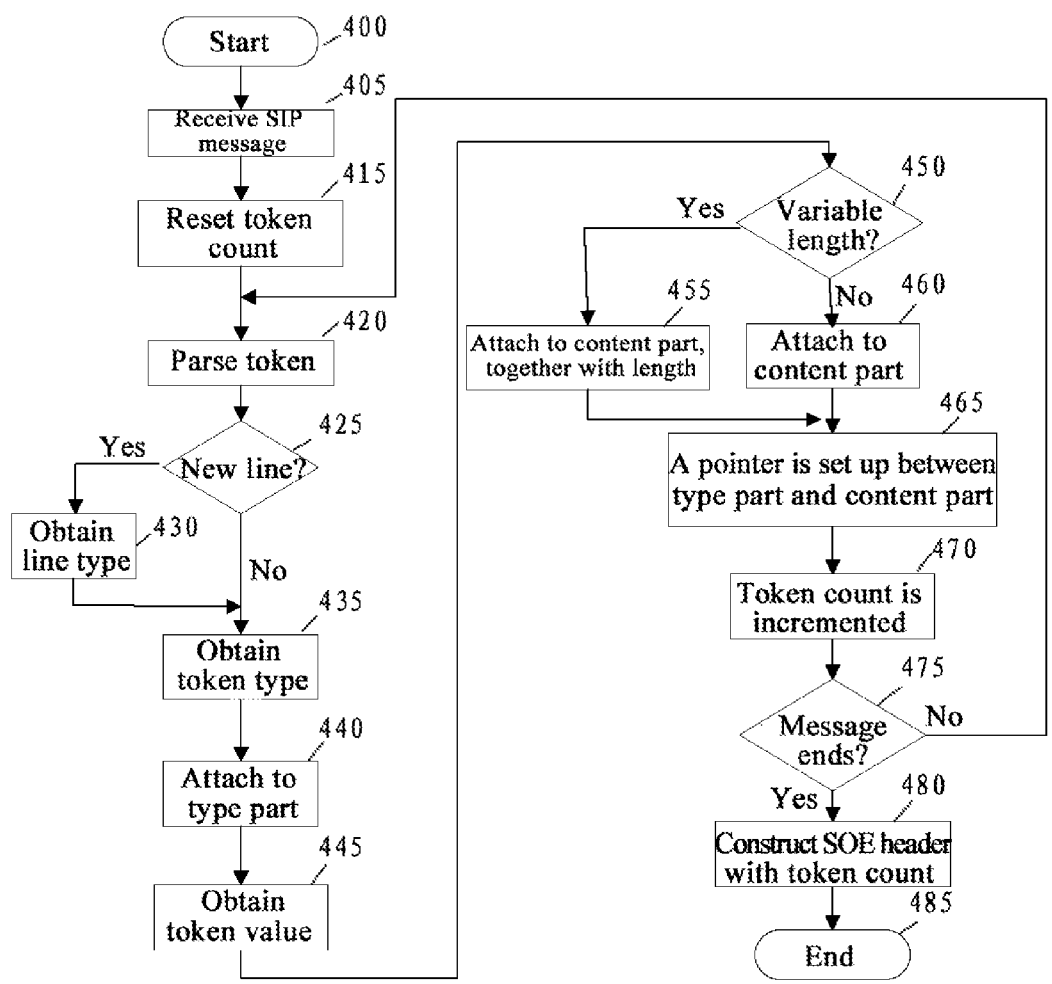
FIG. 4 illustrates a flowchart of a method for binarizing SIP messages according to an embodiment of the invention.

In order to binarize SIP messages efficiently, the invention proposes a new SOE message structure. As seen from FIG. 2, the overall structure of an SOE message according to a preferable embodiment of the invention comprises three parts:

An SOE header part 210, for storing the SOE message level information.

A token type entry part 220, for storing the token type information, wherein it may comprise a plurality of fixed-length (aligned) entries.

A token content entry part 230, for storing the token value, wherein it may comprise a plurality of variable-length entries.

FIG. 3 illustrates the data structure of an SOE message according to a preferable embodiment of the invention. Referring to FIG. 3, in the present invention, the tokens contained in an SIP message are transformed to token type entries 310 and token content entries 320 in a certain format, and both are grouped respectively. The token type is denoted with TYPE_A.TYPE_B in the type entries 310, wherein, the TYPE_A part distinguishes which header the token is in, and the TYPE_B part tells the detailed type information of the token. Such type denotation just fits the characters of the SIP message format and semantic. Each of them has a fixed length. In the type entries 310, the type entries of all tokens are grouped together, for enabling fast information retrieval. The type entries 310 also comprise VALUE_OR_PTR fields, in each of which it contains a pointer to the location where there is the certain value in the content entry corresponding to the type entry field, or, if the certain value is less than the field length defined for the field, then the value is stored directly in the VALUE_OR_PTR field. The content entries 320 are stored separately from the type entries 310. The content entries of all tokens are grouped together, and indexed by the VALUE_OR_PTR fields in the type entries. Thus, the complete information of each token can be accessed independently.

It can be seen from above that in the SOE message structure according to the preferable embodiment of the invention, since the type entries of all tokens are grouped together, stored with a plurality of fixed-length (aligned) entries, and indexed by the VALUE_OR_PTR between the type entries and the content entries, it is possible to rapidly retrieve the information of some certain token. Thus, not only does the SOE message structure according to the preferred embodiment of the invention reduce the load of the SIP server and improve the processing efficiency of the SIP server, but also it facilitates the SIP server to selectively process the information of the certain tokens in an SIP message according to a particular application.

Based on the above SOE message structure, the invention first proposes a method for binarizing SIP messages in conjunction with the preferable embodiment. A front end will parse each token in SIP messages by taking full advantage of its message processing ability and encode them into SOE messages. The binarizing transformation performed according to the method of the present invention has the following features:

No information is lost during the transformation;
The transformation is performed per message based on stateless principles, that is, the front end does not need to maintain any state for message transformation when the message passes through it;
No string parsing is needed at the server end;
Space storage efficiency is considered for the SOE message.

Now referring to FIG. 4, FIG. 4 is a flowchart of a method for binarizing SIP messages according to an embodiment of the invention. It is noted that the details of the above-mentioned three parts of the SOE message are to be introduced in detail with respect to FIG. 5A-5D in the process of describing the method of the invention. In FIG. 4, the method starts with Step 400, and then proceeds to Step 405, in which an SIP message is received by a front end. Then in Step 415, the token count is reset, that is, the token count is set to zero. Then in Step 420, each token in the SIP message is parsed. In Step 425, it is determined whether a new line is being parsed in the SIP message. If so, then in Step 430 the line type is obtained and the process proceeds to Step 435. If not, it proceeds to Step 435 directly. In Step 435, the token type is obtained. Then in Step 440, the token type is attached to the type field part of the token type entry part 220, as shown in FIG. 5B. FIG. 5B is an illustrative diagram of the token type entry part 220. In the token type entry part 220, every 4 bytes will contain the encoding of one token and one value or a pointer to one value. For processing efficiency, each entry is restricted to the 4-byte boundary. For message space efficiency, each entry may be placed right after the previous one. In either case, the required value can be determined accurately with the pointer and the value length.

All the tokens will be encoded in the format of TYPE_A.TYPE_B, which is denoted as a token in the style of Method.Field or Header.Field. Namely, the token type part 220 comprises three fields: TYPE_A, TYPE_B, and VALUE_OR_PTR. The descriptions for each field in the token type entry part 220 are introduced in the following Table 1.

TABLE 1

Field descriptions for token type entry part

| Field Name | Field Width | Field Definition |
|---|---|---|
| TYPE_A | 1 Byte | In the TYPE_A part, each method has a corresponding code, and some codes are reserved for more methods to be appeared in the future. And the response is encoded with one value despite of the detailed status code, which is treated as a field to be encoded in TYPE_B. Likewise, the header type is also encoded in the TYPE_A part, and some codes are reserved for more headers to be appeared in the future. For the body, or the content, of the SIP message, another code will be allocated. |
| TYPE_B | 1 Byte | The TYPE_B part is used for encoding fields and parameters. Parameters are in the format of "Parameter Name = Parameter Value (PName = PValue)". For fields that are not in the above format, a corresponding code is given for each possible field in TYPE_B. Some known/important parameters will be treated similarly as a field with a code allocated. All other parameters will be encoded with a pair of codes, one for "general parameter name" and the other for "general parameter value". |
| VALUE_OR_PTR | 2 Bytes | If the value determined by TYPE_A and TYPE_B is a 16-bit value, then it is directly put into the field. Otherwise, in the field there will be a pointer to the content part, which is an offset from the beginning of the content part. |

Continuing the process of the method of the invention, after the Step 440 completes, in Step 445, the token value is obtained. In Step 450, it is determined whether the token value has a variable length. If not, the token value has a fixed length, and in Step 460 the token value is attached to the value part of the token content part 230. It is noted that the token value will be directly attached to the VALUE_OR_PTR field of the above token type entry part 220 if it is less than 2 bytes.

And the token value will be attached to the token content entry part 230, as shown in FIG. 5C if it is more than 2 bytes. FIG. 5C is an illustrative diagram illustrating the encoding for the fixed-length value in the token content entry part 230. The token content entry part 230 is used for storing the value determined according to TYPE_A and TYPE_B defined above. Referring to FIG. 5C, if the length of the value determined by TYPE_A and TYPE_B is fixed and it exceeds 2 bytes, then the fixed-length value is directly put into this part, and is pointed to by the pointer in the corresponding token type entry part.

If the determination in Step 450 is yes, then the token value has variable length, and in Step 455 the token value, together with its length, is attached to the token content entry part 230 as shown in FIG. 5D. FIG. 5D is an illustrative diagram illustrating the encoding for the variable-length value in the token content entry part 230. Referring to FIG. 5D, if the field and the known parameter value are variable in length, then the value is stored in the format shown in FIG. 5D, wherein the value appears after its VALUE_LENGTH field. The field descriptions for the variable-length value in the token content entry part 230 are introduced in the following Table 2.

TABLE 2

Field descriptions for variable-length value in token content entry part

| Field Name | Field Width | Field Definition |
| --- | --- | --- |
| VALUE_LENGTH | 2 Bytes | Length of the value in bytes, counted from the start to the end of the value, excluding the 2 bytes of this field itself. |
| VALUE | Variable, and specified by VALUE_LENGTH | Usually a string. |

It is noted that, for a general parameter, since it has a pair of codes, one for parameter name and the other for parameter value, each of them is still fit into the format shown in FIG. 5D.

It is further noted that, as the evolution of SIP standards is going on, a new method or a new header can be defined. Before a new code is assigned to it and the corresponding processing logic is ready, the new method or the new header will be encoded as an unknown method or an unknown header. For an unknown method, one code will be assigned in TYPE_A, and its value will be a string pointed by the pointer, denoting what the method is. The rest of the request line is parsed and encoded just like that for a known method. For an unknown header, it is necessary to maintain the name and the rest of the header. Therefore, the unknown header will have two codes assigned, just like those for a general parameter.

Continuing the process of the method of the invention, after the Step 455 or 460 completes, it proceeds to Step 465, in which a pointer is set up between the token type entry part 220 and the token content entry part 230. Then in Step 470, the token count is incremented by 1. In Step 475 it is determined whether the message ends. If not, the process returns to Step 420 to continue to parse the message. If yes, it proceeds to Step 480, the SOE header with token count, as shown in FIG. 6A, is constructed. FIG. 6A is an illustrative diagram illustrating the SOE header part 210. The SOE header part 210 is a general part for all SOE messages. As shown in FIG. 6A, the SOE header part 210 comprises: SOE_ID, SOE_Version, Message_Length, Entry_Number, and Reserved. The field descriptions in the SOE header part 210 are introduced in the following Table 3.

TABLE 3

Field descriptions for SOE header part

| Field Name | Field Width | Field Definition |
| --- | --- | --- |
| SOE_ID | 1 Byte | The field is used for distinguishing SOE messages from SIP messages. Since SIP messages are text-based, one value that will not appear as a character in the text is selected. |
| SOE_Version | 1 Byte | Version of SOE Specification. Currently it is linked with the SIP version. The high 4 bits are the major version, and the low 4 bits are the minor version. |
| Message_Length | 2 Bytes | Length of the total message in bytes, from the SOE_ID to the last byte of the token content part. |
| Entry_Number | 2 Bytes | Number of the token entries in the token entry part. |
| Reserved | 2 Bytes | Reserved for further extension. |

After Step 480 completes, the process of the method of the invention ends in Step 485.

A method for binarizing SIP messages is introduced hereinabove based on the structure of the SOE message according to the preferable embodiment of the invention. The reference encoding for an SOE message and the example of the SIP-SOE message transformation is given in the end of the text.

After the SIP message is binarized by the front end, the SOE message is generated. As recited above, in the SOE message according to the preferable embodiment of the invention, since the type entries of all tokens are grouped together, stored with a plurality of fixed-length (aligned) entries, and indexed by VALUE_OR_PTR between the type entries and the content entries, it is possible to rapidly retrieve the information of some certain token. Thus, the structure of the SOE message according to the preferable embodiment of the present invention also facilitates the SIP server to selectively process the information of certain tokens in an SIP message according to a particular application.

Figure 6:
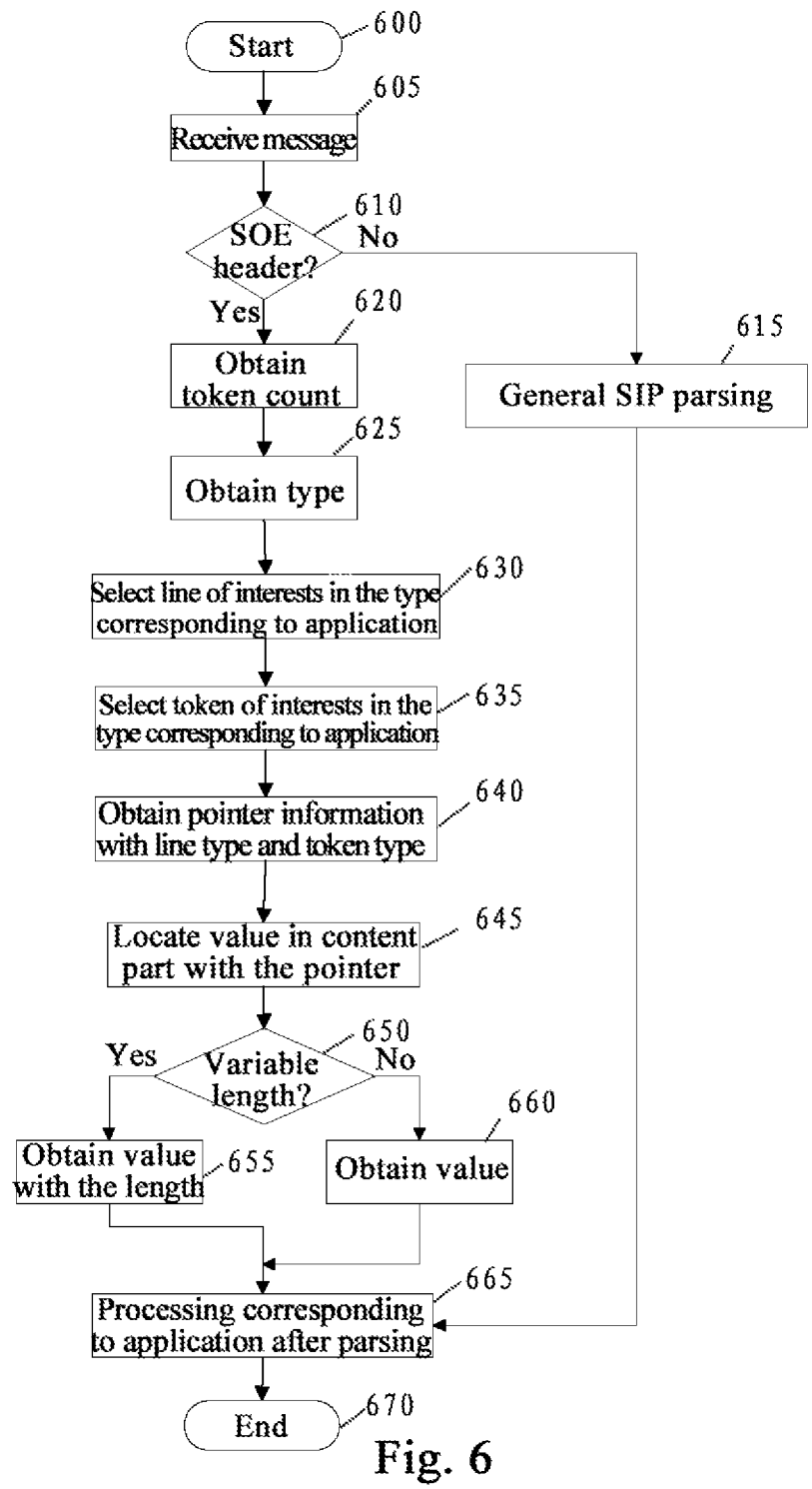
FIG. 6 illustrates a flowchart of a method for selectively processing messages at the server end.

FIG. 6 illustrates a flowchart of a method for selectively processing messages at the SIP server end. In FIG. 6, the method starts with Step 600, and then proceeds to Step 605, in which a message is received by the server. Then in Step 610, it is determined whether the SOE header exists. If not, then the message is not an SOE message but an SIP message, and the process proceeds to Step 615 in which the general SIP parsing is performed directly. If so, then it proceeds to Step 620 and 625, in which the token count and the type in the token type entry part are obtained in turn.

Then in Step 630, the line of interests in the type of the token type entry part corresponding to the application running on the server is selected. In Step 635, the token of interests in the type of the token type entry part corresponding to the application running on the server is selected. In Step 640, the pointer information is obtained with the line type and the token type. Then in Step 645, the value in the token content entry part is located with the pointer.

In Step 650 it is determined whether the value has a variable length. If so, in Step 655 the value is obtained with its length. Otherwise in Step 660 the value is obtained directly. After Step 655 or 660 or 615, in Step 665 the processing corresponding to the application after message parsing is performed. After Step 665 completes, the process of the method of the invention ends in Step 670.

A method for binarizing SIP messages and a method for selectively processing messages at the server end according to the embodiments of the invention are introduced as above.

In the above embodiments, in the process of binarizing SIP messages, it is the respective tokens that are parsed in the SIP messages. It is apparent for the person with ordinary skills in the art that it is possible to only parse the specified type of tokens, the specified SIP message lines in the front end according to the application running on the back-end server end. Moreover, the parsing granularity is not limited to tokens. For an SIP message not interested by the current application, it is possible to encapsulate parts of message lines or even the whole message as an entry in the SOE message. Further, at the back-end server end it is possible to only process the parts of SOE message of one's interests. Thus, the structure of the SOE message according to the invention may process SIP messages in different granularities and in different time sequences.

Figure 7A:
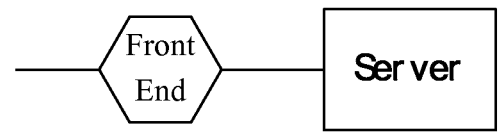
FIG. 7 illustrates a structural schematic diagram of processing SIP messages in different granularities and in different time sequences according to preferable embodiments of the invention.
Figure 7B:
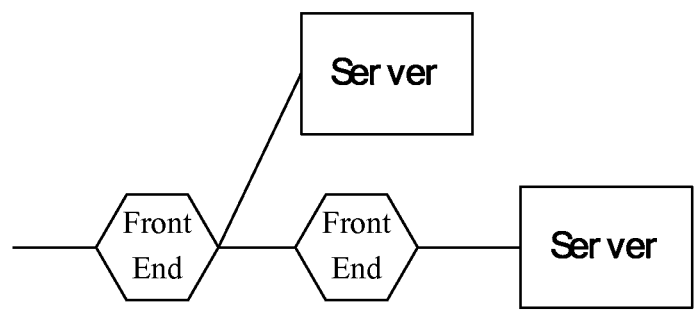
Figure 7C:
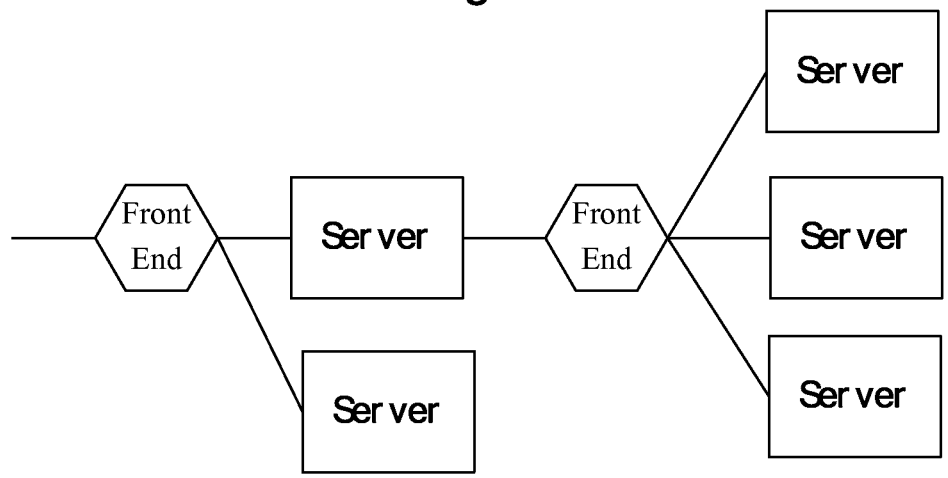

FIG. 7 illustrates a structural schematic diagram of processing SIP messages in different granularities and in different time sequences according to preferable embodiments of the invention. In FIG. 7, one or more front ends and optional other functional nodes are linked to one or more servers, to form a homogeneous, hierarchical, and distributed SIP processing path, so that it is able to processing SIP messages in different granularities (which may be any of the following granularities: token, line, header, whole message) and in different time sequences.

Figure 8:
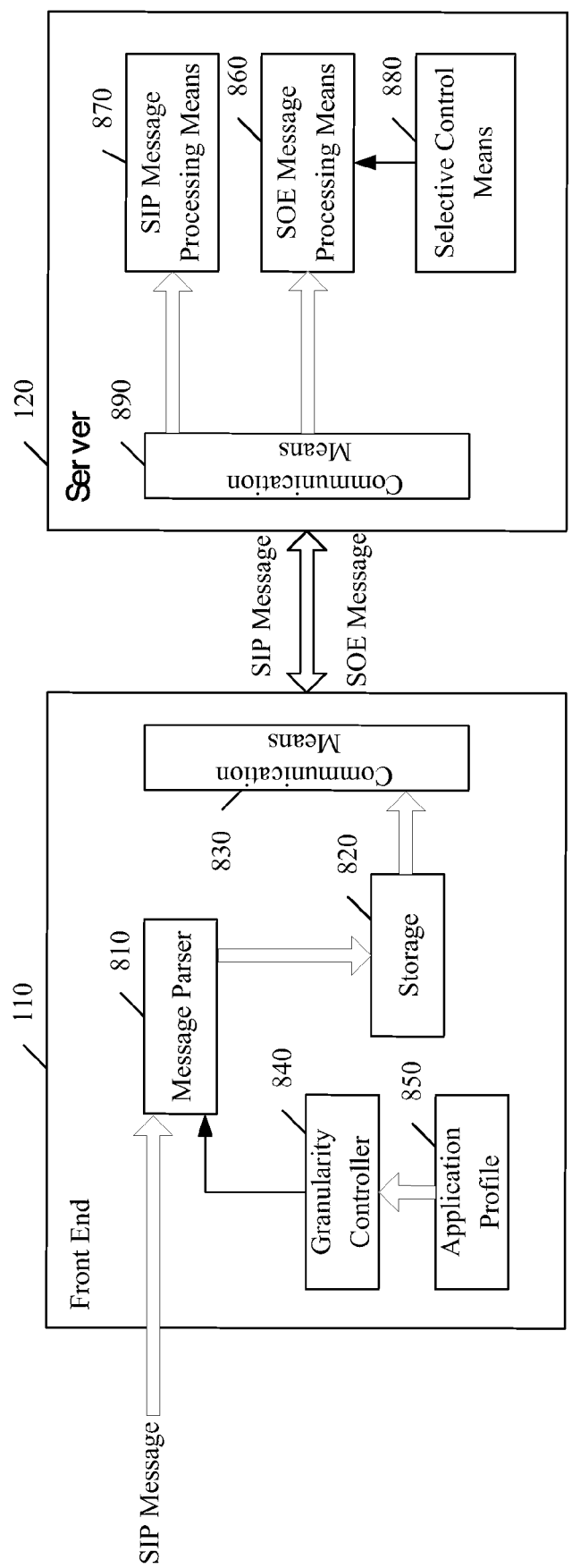
FIG. 8 illustrates a schematic diagram of a system for processing SIP messages according to a preferable embodiment of the invention.

Under the same inventive concept, the invention also proposes a system for processing SIP messages. FIG. 8 illustrates a schematic diagram of a system for processing SIP messages according to a preferable embodiment of the invention. The system comprises a front end 110 and a server 120, wherein the front end 110 comprises a message parser 810, a storage 820, a communication means 830, a granularity controller 840, and an application profile 850; the server 120 comprises an SOE message processing means 860, an SIP message processing means 870, a selective control means 880, and a communication means 890. The communication means 830 in the front end 110 and the communication means 890 in the server 120 are communicated with each other to set up a data transmission mechanism. The message parser 810 is used for parsing the SIP messages received by the front end based on the information from the granularity controller 840, wherein the parsing granularity may be any of the following granularities: token, line, header, whole message. The granularity controller 840 is used for determining the parsing granularity of the message parser 810 according to the need of the application at the server end or based on the application profile 850. The application profile 850 is used for storing the attributes of various applications and the message lines or tokens they are interested. The SOE message processing means 860 is used for selectively processing the received messages under the control of the selective control means 880.

Reference encoding for SOE message and example of SIP-SOE message transformation In order to facilitate the understanding of the binarizing transformation of the present invention, the reference encoding for TYPE_A is provided hereinbelow by referring to Table 4. The italic parameters in Table 4 indicate that they contain other parameters or fields, which are further listed in the first column of Table 5 hereinbelow.

TABLE 4

TYPE_A encoding for methods and headers
TYPE_A Code Table

| Type | Name | Code | TYPE_B parameters or fields available for this TYPE_A Code | | | |
|---|---|---|---|---|---|---|
| Unknown | Unknown Method | −1 | method-name | | | |
|  | Unknown Header | −2 | Header-name | header-value | | |
| Body | Message Body | −3 | Content | | | |
| Response | RESPONSE | 0 | major-version | minor-version | status-code | reason-phrase |
| Method | INVITE | 1 | *addr-spec* | major-version | minor-version | |
|  | REGISTER | 2 | *addr-spec* | major-version | minor-version | |
|  | BYE | 3 | *addr-spec* | major-version | minor-version | |
|  | ACK | 4 | *addr-spec* | major-version | minor-version | |
|  | CANCEL | 5 | *addr-spec* | major-version | minor-version | |
|  | OPTIONS | 6 | *addr-spec* | major-version | minor-version | |
|  | REFER | 7 | *addr-spec* | major-version | minor-version | |
|  | SUBSCRIBE | 8 | *addr-spec* | major-version | minor-version | |
|  | NOTIFY | 9 | *addr-spec* | major-version | minor-version | |
|  | MESSAGE | 10 | *addr-spec* | major-version | minor-version | |
|  | INFO | 11 | *addr-spec* | major-version | minor-version | |
|  | PRACK | 12 | *addr-spec* | major-version | minor- | |

TABLE 4-continued

TYPE_A encoding for methods and headers
TYPE_A Code Table

| Type | Name | Code | TYPE_B parameters or fields available for this TYPE_A Code | | | |
|---|---|---|---|---|---|---|
| | UPDATE | 13 | *addr-spec* | major-version | version minor-version | |
| Header | Accept | 33 | q-param | m-type | m-subtype | *m-parameter* |
| | Accept-Encoding | 34 | q-param | encoding | | |
| | Accept-Language. | 35 | language-range | q-param | | |
| | Alert-Info | 36 | absolute-uri | | | |
| | Allow. | 37 | method-param | | | |
| | Authentication-Info | 38 | *ain-info* | | | |
| | Authorization | 39 | *dig-resp* | | | |
| | Call-ID | 40 | call-id string | call-id host | | |
| | Call-Info | 41 | absolute-uri | info-param | *generic-param* | |
| | Contact | 42 | *name-addr* | q-param | expires | *generic-param* |
| | Content-Disposition | 43 | disp-type | *disp-param* | | |
| | Content-Encoding | 44 | Encoding | | | |
| | Content-Language | 45 | language-tag | | | |
| | Content-Length | 46 | content-length | | | |
| | Content-Type | 47 | m-type | m-subtype | m-parameter | |
| | CSeq | 48 | seq-number | Method | | |
| | Date | 49 | *rfc1123-date* | | | |
| | Error-Info | 50 | absolute-uri | *generic-param* | | |
| | Expires | 51 | delta-seconds | | | |
| | From | 52 | *name-addr* | tag | *generic-param* | |
| | In-Reply-To | 53 | call-id-first-part | call-id-second-part | | |
| | Max-Forwards | 54 | max-forwards | | | |
| | Min-Expires | 55 | delta-seconds | | | |
| | MIME-Version | 56 | major-version | minor-version | | |
| | Organization | 57 | Name | | | |
| | Priority | 58 | Priority | | | |
| | Proxy-Authenticate | 59 | *digest-cln* | other-challenge | | |
| | Proxy-Authorization | 60 | *dig-resp* | | | |
| | Proxy-Require | 61 | option-tag | | | |
| | Record-Route | 62 | *name-addr* | *generic-param* | | |
| | Reply-To | 63 | *name-addr* | addr-spec | *generic-param* | |
| | Require | 64 | option-tag | | | |
| | Retry-After | 65 | delta-seconds | generic-param | | |
| | Route | 66 | *name-addr* | generic-param | | |
| | Server | 67 | product-name | product-version | | |
| | Subject | 68 | Name | | | |
| | Supported | 69 | option-tag | | | |
| | Timestamp | 70 | Timestamp | | | |
| | To | 71 | *name-addr* | tag | *generic-param* | |
| | Unsupported | 72 | option-tag | | | |
| | User-Agent | 73 | product-name | product-version | | |
| | Via | 74 | *sent-protocol* | sent-by | *via-params* | |
| | Warning | 75 | warn-code | warn-agent | warn-text | |
| | WWW-Authenticate | 76 | *digest-cln* | other-challenge | | |

The possible fields and parameters are listed hereinbelow in Table 5. Some parameters/fields may appear in different headers. For completeness, the complete possibilities that these parameters/fields appear in the corresponding headers are listed.

TABLE 5

List of possible parameters/fields

| Dividable parameters or fields | Parameters or fields | VALUE_OR_PTR for this TYPE_B code (blank denotes a pointer) |
|---|---|---|
| | method-name | |
| | header-name | |
| | header-value | |

TABLE 5-continued

List of possible parameters/fields

| Dividable parameters or fields | Parameters or fields | VALUE_OR_PTR for this TYPE_B code (blank denotes a pointer) |
|---|---|---|
|  | Content |  |
| generic-param | generic-param-name |  |
|  | generic-param-value |  |
| addr-spec | Scheme |  |
|  | User |  |
|  | Password |  |
|  | Host |  |
|  | Port | Value |
|  | Scheme-data |  |
|  | uri-parameters |  |
|  | headers (each header is processed as generic-param) |  |
| Host | Hostname |  |
|  | ipv4address |  |
|  | ipv6address |  |
| name-addr | Scheme |  |
|  | user/telephone-subscriber |  |
|  | password |  |
|  | Host |  |
|  | port number |  |
|  | Absolute-uri |  |
|  | display-name |  |
| uri-param | transport-param |  |
|  | user-param |  |
|  | method-param |  |
|  | ttl-param | Value |
|  | maddr-param=host |  |
|  | lr-param | Value |
|  | compression-param |  |
|  | other-param=generic-param |  |
| callid | call-id-first-part |  |
|  | call-id-second-part |  |
|  | algorithm |  |
|  | nonce |  |
| media-type | m-type |  |
|  | m-subtype |  |
|  | m-parameter |  |
| m-parameter | m-attribute |  |
|  | m-value |  |
| ainfo | nextnonce |  |
|  | message-qop |  |
|  | response-auth |  |
|  | nonce |  |
|  | nonce-count |  |
| dig-resp | username |  |
|  | realm |  |
|  | nonce |  |
|  | digest-uri = add-spec |  |
|  | dresponse |  |
|  | algorithm |  |
|  | cnonce |  |
|  | opaque |  |
|  | message-qop |  |
|  | nonce-count |  |
|  | auth-param |  |
| auth-param | auth-param-name |  |
|  | auth-param-value |  |
| digest-cln | realm |  |
|  | domain |  |
|  | nonce |  |
|  | opaque |  |
|  | stale | Value |
|  | algorithm |  |
|  | qop-options |  |
|  | auth-param |  |
| rfc1123-date | wkday |  |
|  | date |  |
|  | month |  |
|  | year |  |
|  | time |  |
| sent-protocol | protocol-name |  |
|  | protocol-version |  |
|  | transport=trasport-param |  |
| via-params | via-ttl=ttl-param |  |
|  | via-maddr=maddr-param |  |
|  | via-received |  |
|  | via-branch |  |
|  | via-extension=generic-param |  |
|  | via-received |  |
| other-chanllenge | auth-scheme |  |
|  | auth-param |  |
|  | language-tag=language-range |  |
| sent-by | host |  |
|  | port |  |
| disp-param | handling-param |  |
|  | generic-param |  |
|  | absolute-uri=scheme-data |  |
|  | accept-param=q-param |  |
|  | option-tag= tag |  |
|  | content-coding=encoding |  |
|  | expires=delta-seconds |  |
|  | info-param=purpose |  |
|  | domain |  |
|  | delay |  |
|  | seq-number |  |
|  | major-version |  |
|  | minor-version |  |
|  | tag |  |
|  | option-tag |  |
|  | product-name |  |
|  | product-version |  |
|  | encoding |  |
|  | q-param |  |
|  | language-range |  |
|  | purpose |  |
|  | delta-seconds |  |
|  | wildcard |  |
|  | disp-type |  |
|  | handling-param |  |
|  | content-length |  |
|  | seq-number |  |
|  | max-forwards |  |
|  | name |  |
|  | priority |  |
|  | duration |  |
|  | via-received |  |
|  | via-branch |  |
|  | protocol-name |  |
|  | protocol-version |  |
|  | warn-code | Value |
|  | warn-text |  |
|  | warn-agent |  |
|  | status-code | Value |
|  | reason-phrase |  |

The reference encoding for TYPE_B is provided hereinbelow by referring to Table 6. In Table 6 some examples of fields or parameters are listed.

TABLE 6

TYPE_B encoding for parameters/fields

| Parameter or Field Name | Code | VALUE_OR_PTR for this TYPE_B code | Example |
|---|---|---|---|
| method-name | −1 | | |
| header-name | −2 | | |
| header-value | −3 | | |
| Content | −4 | | |
| generic-param-name | 0 | | |
| generic-param-value | 1 | | |
| Scheme | 2 | | SIP |
| User | 3 | | bob |
| password | 4 | | abcdefg |
| hostname | 5 | | biloxi.com |
| Port | 6 | Value | 5060 |
| scheme-data | 7 | | http://www.biloxi.com |
| IPv4address | 8 | | 192.0.2.1 |
| IPv6address | 9 | | 3ffe:3201:1401:1:280:c8ff:fe4d:db39 |
| display-name | 10 | | Bob |
| transport-param | 11 | | udp |
| User-param | 12 | | user=phone |
| method-param | 13 | | INVITE |
| ttl-param | 14 | Value | ttl=15 |
| Maddr-param | 15 | | maddr=224.2.0.1 |
| lr-param | 16 | Value | lr |
| callid-first-part | 17 | | a84b4c76e66710 |
| callid-second-part | 18 | | atlanta.example.com |
| algorithm | 19 | | algorithm=MD5 |
| Nonce | 20 | | nonce="MzQ0a2xrbGtmbGtsZm9wb2tsc2tqaHJzZXNy9uQyMzMzMzQK=" |
| username | 21 | | username="bob" |
| Realm | 22 | | Realm="atlanta.example.com" |
| digest-uri | 23 | | sip:bob@biloxi.com:5060 |
| dresponse | 24 | Ptr+Fixed | response="dfe56131d1958046689d83306477eccd" |
| Cnonce | 25 | | nonce="ea9c8e88df84f1cec4341ae6cbe5a359" |
| Opaque | 26 | | opaque="" |
| Message-qop | 27 | | qop="auth" |
| nonce-count | 28 | Ptr+Fixed | |
| Auth-scheme | 29 | | |
| Auth-param-name | 30 | | |
| Auth-param-value | 31 | | |
| nextnonce | 32 | | |
| response-auth | 33 | | |
| m-attribute | 34 | | m-attribute EQUAL m-value |
| m-value | 35 | | |
| domain | 36 | | |
| Stale | 37 | Value | Stale=FALSE |
| qop-options | 38 | | |
| timestamp | 39 | Ptr+Fixed | |
| delay | 40 | Ptr+Fixed | |
| weekday | 41 | | Thu |
| Day | 42 | | 21 |
| month | 43 | | Feb |
| year | 44 | | 2002 |
| hour | 45 | | 12 |
| minute | 46 | | 33 |
| second | 47 | | 56 |
| Uri-param-name | 48 | | |
| Uri-param-value | 49 | | |
| major-version | 50 | Ptr+Fixed | 2 |
| minor-version | 51 | Ptr+Fixed | 0 |
| Tag | 52 | | |
| option-tag | 53 | | |
| product-name | 54 | | |
| product-version | 55 | | 2.0.0 |
| encoding | 56 | | Gzip |
| q-param | 57 | Ptr+Fixed | 0.8 |
| language-range | 58 | | en-gb |
| purpose | 59 | | |
| delta-seconds | 60 | Ptr+Fixed | 7200 |
| wildcard | 61 | | |
| disp-type | 62 | | |
| handling-param | 63 | | |
| content-length | 64 | Ptr+Fixed | 142 |
| Seq-number | 65 | Ptr+Fixed | 314159 |
| max-forwards | 66 | Ptr+Fixed | 70 |
| name | 67 | | |
| priority | 68 | | |
| duration | 69 | Ptr+Fixed | |

TABLE 6-continued

TYPE_B encoding for parameters/fields

| Parameter or Field Name | Code | VALUE_OR_PTR for this TYPE_B code | Example |
|---|---|---|---|
| Via-received | 70 | | |
| Via-branch | 71 | | branch=z9hG4bK74b76 |
| protocol-name | 72 | | |
| protocol-version | 73 | | |
| warn-code | 74 | Value | 301 |
| warn-text | 75 | | Incompatible network address type 'E.164' |
| warn-agent | 76 | | |
| status-code | 77 | Value | 200 |
| reason-phrase | 78 | | OK |
| m-type | 79 | | Application |
| m-subtype | 80 | | Sdp |

In the field of "VALUE_OR_PTR for this TYPE_B code", blank denotes that there will be a variable-length value, with a "VALUE_LENGTH" field in the token content part, and "Ptr+Fixed" denotes that the value is fixed in length, so that there is no "VALUE_LENGTH" field in the token content part.

The details of the fixed-length fields in the token content part are shown as below in Table 7.

TABLE 7

Fixed-length fields in the token content part

| Field Name | Appeared in | Length |
|---|---|---|
| content-length | Content-Length header | Integer, 4 Bytes |
| seq-number | CSeq header | Integer, 4 Bytes |
| delta-seconds | Expires, Retry-After and other headers | Integer, 4 Bytes |

TABLE 7-continued

Fixed-length fields in the token content part

| Field Name | Appeared in | Length |
|---|---|---|
| max-forwards | Max-Forwards header | Integer, 4 Bytes |
| duration | Retry-After header | Integer, 4 Bytes |
| major-version | SIP Version | Integer, 4 Bytes |
| minor-version | SIP Version | Integer, 4 Bytes |
| q | Many headers, such as Accept-Encoding | Float, 4 Bytes |
| timestamp | Timestamp header | Float, 4 Bytes |
| delay | Timestamp header | Float, 4 Bytes |
| dresponse | Many headers | String, 32 Bytes |
| nonce-count | Many headers | String, 8 Bytes |

Two SIP messages, one INVITE message and one REGISTER message, will be used as examples to show the SOE transformation with the encoding mechanism according to the invention by referring to Table 8 and Table 9 hereinbelow.

TABLE 8

Encoding example of INVITE message

Encoding Example of INVITE Message

| | |
|---|---|
| Message in String | INVITE sip:bob@biloxi.com SIP/2.0<br>Via: SIP/2.0/UDP pc33.atlanta.com;branch=z9hG4bKnashds8<br>Max-Forwards: 70<br>To: Bob <sip:bob@biloxi.com><br>From: Alice <sip:alice@atlanta.com>;tag=1928301774<br>Call-ID: a84b4c76e66710<br>CSeq: 314159 INVITE<br>Contact: <sip:alice@pc33.atlanta.com><br>Content-Type: application/sdp<br>Content-Length: 142<br>... (BODY) ... |

| Message in Binary | TYPE_A (8 bits) | | TYPE_B (8 bits) | | VALUE_OR_PTR (16 bits) | |
|---|---|---|---|---|---|---|
| | Name | Code | Name | Code | Type | Value or buffer content pointed by Ptr |
| | INVITE | 1 | scheme | 2 | Ptr | "SIP" |
| | INVITE | 1 | user | 3 | Ptr | "bob" |
| | INVITE | 1 | hostname | 5 | Ptr | "biloxi.com" |
| | INVITE | 1 | major-version | 50 | Ptr | 2 |
| | INVITE | 1 | minor-version | 51 | Ptr | 0 |
| | Via | 74 | protocol-name | 72 | Ptr | "SIP" |
| | Via | 74 | protocol-version | 73 | Ptr | "2.0" |
| | Via | 74 | transport-param | 11 | Ptr | "UDP" |
| | Via | 74 | hostname | 5 | Ptr | "pc33.atlanta.com" |
| | Via | 74 | via-branch | 71 | Ptr | "z9hG4bKnashds8" |
| | Max-Forwards | 54 | max-forwards | 66 | Ptr | "70" |
| | To | 71 | display-name | 10 | Ptr | Bob |

TABLE 8-continued

Encoding example of INVITE message

| | | | | | |
|---|---|---|---|---|---|
| To | 71 | scheme | 2 | Ptr | "SIP" |
| To | 71 | user | 3 | Ptr | "bob" |
| To | 71 | hostname | 5 | Ptr | "biloxi.com" |
| From | 52 | display-name | 10 | Ptr | Alice |
| From | 52 | scheme | 2 | Ptr | "SIP" |
| From | 52 | user | 3 | Ptr | "alice" |
| From | 52 | hostname | 4 | Ptr | "atlanta.com" |
| From | 52 | tag | 52 | Ptr | "1928301774" |
| Call-ID | 40 | call-id-first-part | 17 | Ptr | "a84b4c76e66710" |
| CSeq | 48 | seq-number | 65 | Ptr | 314159 |
| CSeq | 48 | method-param | 13 | Ptr | "INVITE" |
| Contact | 42 | scheme | 2 | Ptr | "SIP" |
| Contact | 42 | user | 3 | Ptr | "alice" |
| Contact | 42 | hostname | 5 | Ptr | "pc33.atlanta.com" |
| Content-Type | 47 | m-type | 79 | Ptr | "application" |
| Content-Type | 47 | m-subtype | 80 | Ptr | "sdp" |
| Content-Length | 46 | content-length | 64 | Ptr | 142 |
| Message-Body | −3 | content | −4 | Ptr | " ... (BODY) ... " |

TABLE 9

Encoding example of REGISTER message

| | |
|---|---|
| Message in String | REGISTER sip:registrar.biloxi.com SIP/2.0<br>Via: SIP/2.0/UDP bobspc.biloxi.com:5060;branch=z9hG4bKnashds7<br>Max-Forwards: 70<br>To: Bob <sip:bob@biloxi.com><br>From: Bob <sip:bob@biloxi.com>;tag=456248<br>Call-ID: 843817637684230@998sdasdh09<br>CSeq: 1826 REGISTER<br>Contact: <sip:bob@192.0.2.4><br>Expires: 7200<br>Content-Length: 0 |

| Message in Binary | TYPE_A (8 bits) | | TYPE_B (8 bits) | | VALUE_OR_PTR (16 bits) | |
|---|---|---|---|---|---|---|
| | Name | Code | Name | Code | Type | Value or buffer content pointed by Ptr |
| | REGISTER | 2 | Scheme | 2 | Ptr | "SIP" |
| | REGISTER | 2 | Hostname | 5 | Ptr | "registar.biloxi.com" |
| | REGISTER | 2 | major-version | 50 | Ptr | 2 |
| | REGISTER | 2 | minor-version | 51 | Ptr | 0 |
| | Via | 74 | protocol-name | 72 | Ptr | "SIP" |
| | Via | 74 | protocol-version | 73 | Ptr | "2.0" |
| | Via | 74 | transport-param | 11 | Ptr | "UDP" |
| | Via | 74 | Hostname | 5 | Ptr | "bobspc.biloxi.com" |
| | Via | 74 | Port | 6 | Value | 5060 |
| | Via | 74 | via-branch | 71 | Ptr | "z9hG4bKnashds7" |
| | Max-Forwards | 54 | max-forwards | 66 | Ptr | 70 |
| | To | 71 | display-name | 10 | Ptr | Bob |
| | To | 71 | Scheme | 2 | Ptr | "SIP" |
| | To | 71 | User | 3 | Ptr | "bob" |
| | To | 71 | Hostname | 5 | Ptr | "biloxi.com" |
| | From | 52 | display-name | 10 | Ptr | Bob |
| | From | 52 | Scheme | 2 | Ptr | "SIP" |
| | From | 52 | User | 3 | Ptr | "bob" |
| | From | 52 | Hostname | 5 | Ptr | "biloxi.com" |
| | From | 52 | Tag | 52 | Ptr | "456248" |
| | Call-ID | 40 | call-id-first-part | 17 | Ptr | "843817637684230" |
| | Call-ID | 40 | call-id-second-part | 18 | Ptr | "998sdasdh09" |
| | CSeq | 48 | seq-number | 65 | Ptr | 1826 |
| | CSeq | 48 | method-param | 13 | Ptr | "REGISTER" |
| | Contact | 42 | Scheme | 2 | Ptr | "SIP" |
| | Contact | 42 | User | 3 | Ptr | "bob" |
| | Contact | 42 | ipv4address | 8 | Ptr | "192.0.2.4" |
| | Expires | 51 | delta-seconds | 60 | Ptr | 7200 |
| | Content-Length | 46 | content-length | 64 | Ptr | 0 |

The detailed descriptions of a method and system for binarizing SIP messages for offload and selective processing according to the invention are provided hereinabove with reference to the embodiments. As appreciated by the person with ordinary skills in the art, the present invention may be embodied as a method, a system, and/or a computer program product. Therefore, the present invention can be embodied in the form of hardware, software, or the combination thereof. Additionally, the present invention may be embodied as a computer program product contained on machine-readable media where the computer executable program instructions for programming a computer system to execute the process according to the invention are stored. The term "machine-readable media" used herein include any media that provide the computer system with instructions for execution. Such media may take various forms, including but not limited to: non-volatile media, volatile media, and transmission media. Non-volatile media commonly comprise, for example, floppy disk, floppy magnetic disk, hard disk, magnetic tape, or any other magnetic media, CD-ROM or any other optical media, slotting card or any other physical media with hole pattern, PROM, EPROM, EEPROM, flash memory, any other memory chip or cartridge, or any other media that can be read by the computer system and are appropriate for storing instructions.

Additionally, it should be appreciated that each block in the flow chart or block chart and the combination of some blocks may be implemented by some computer program instructions. These computer program instructions may be provided to a general purpose computer, a specific purpose computer, or a processor of other programmable data processing device, to produce a machine, in which these instructions, when executed by the computers or the processor of other programmable data processing device, can create the means for implementing the functions indicated by the blocks of the block chart and/or the flow chart.

Although the present invention has been presented and described specifically by reference to the preferred embodiments, it is not intended to be exhaustive or limited the invention in the form disclosed. Many modifications on forms and details will be apparent to those ordinary skills in the art without deviating from the spirit and scope of the invention. The embodiments were chosen and described in order to best explain the principles of the invention, the practical application, and to enable others of ordinary skill in the art to understand the invention for various embodiments with various modifications as are suited to the particular use contemplated.

The invention claimed is:

1. A method for processing session initiation protocol messages, comprising the following steps:

receiving a session initiation protocol (SIP) message by a front end;

parsing the session initiation protocol message by the front end to transform tokens contained in the SIP message into token type entries and token content entries, grouping token type entries and token content entries for all tokens in the session initiation protocol message respectively, storing the token type entries and the token content entries separate from each other, and indexing and setting up corresponding links comprising pointers between the token type entries and the token content entries, wherein the session initiation protocol message, after parsing, is transformed to a session initiation protocol offload engine (SOE) message with parts comprising at least a session initiation protocol offload engine message header part for storing all header message level information for the message; a token type part comprising a plurality of fixed-length entries for storing token type information for all tokens in the session initiation protocol message, wherein the token type part includes one of a value and a pointer to associated token content, and a token content part comprising a plurality of variable-length entries for storing all token contents of the message and a length value for each of the token contents; and communicating the session initiation protocol offload engine message for message processing whereby different token content of the SOE message can be identified by token types for selective processing.

2. The method of claim 1, further comprising processing the transformed session initiation protocol offload engine message at a server end by selectively processing the session initiation protocol offload engine message based on an application at the server end.

3. The method of claims 1, wherein message transforming granularity is different based on an application at a server end, wherein said granularity is one of certain token, certain message line, message header, and whole message.

4. The method of claim 2, wherein the step of selectively processing the session initiation protocol offload engine message comprises selecting token of interests in the token type part and obtaining pointer information and locating the required token content with the pointer information.

5. The method of claim 1, further comprises linking one or more said front ends to one or more servers, to form a homogeneous, hierarchical, and distributed session initiation protocol processing path.

6. The method of claim 1, wherein the token type is denoted with TYPE_A.TYPE_B in the token type part, wherein the TYPE_A part distinguishes which header the token is in, and the TYPE B part tells detailed type information of the token.

7. The method of claim 1, wherein the token type part further comprises a VALUE _OR _PTR field, containing a pointer to a location where there is certain token content in the token content entry corresponding to the type entry field.

8. A system for processing session initiation protocol messages, comprising:

a front end, which comprises a message parser;

a server, which comprises a message processing means;

wherein, a session initiation protocol message (SIP) is received by the front end;

the session initiation protocol message is parsed by the message parser to transform tokens contained in the SIP message into token type entries and token content entries, token type entries and token content entries for all tokens in the session initiation protocol message are grouped respectively and stored separately, and corresponding links comprising pointers are set up between the token type entries and the token content entries, whereby the session initiation protocol message, after parsing, is transformed to a session initiation protocol offload engine (SOE) message comprising at least a session initiation protocol offload engine message header part for storing message level information, a token type part comprising a plurality of fixed-length entries for storing token type information for all tokens in the session initiation protocol message, wherein the token type part includes one of a value and a pointer to associated token content, and a token content part comprising a plurality of variable-length entries for storing token contents and a length value for the token contents; and token contents of the session initiation protocol offload engine message are identified by token types and selectively processed by the message processing means.

9. The system of claim 8, wherein the server further comprises a selective control means, for controlling the message processing means to selectively process the session initiation protocol offload engine message.

10. The system of claim 8, wherein the front end further comprises a granularity controller, for controlling the message processing means for message transforming granularity, wherein said granularity is one of certain token, certain message line, message header, and whole message.

11. The system of claim 10, wherein the front end further comprises an application profile for storing attributes of various applications and the message lines or tokens corresponding to said attributes.

12. The system of claim 8, further comprises linking one or more said front ends to one or more said servers, to form a homogeneous, hierarchical, and distributed session initiation protocol processing path.

13. The system of claims 8, wherein the token type is denoted with TYPE_A.TYPE_B in the token type part, wherein the TYPE_A part distinguishes which header the token is in, and the TYPE_B part comprises detailed type information of the token.

14. The system of claim 8, wherein the token type part further comprises a VALUE_OR_PTR field, containing a pointer to the location at which certain token content in the token content entry corresponding to the type entry field is located.

15. A program product embodied in a computer readable storage device for processing session initiation protocol messages which comprises computer executable program code for performing method steps for processing session initiation protocol messages, said method comprising the steps of:
   receiving a session initiation protocol message (SIP) by a front end;
   parsing the session initiation protocol message by the front end to transform tokens contained in the SIP message into token type entries and token content entries, grouping token type entries and token content entries for all tokens in the session initiation protocol message respectively, storing the token type entries and the token content entries separate from each other, and indexing and setting up corresponding links comprising pointers between the token type entries and the token content entries, wherein the session initiation protocol message, after parsing, is transformed to a session initiation protocol offload engine message with parts comprising at least a session initiation protocol offload engine message header part for storing message level information; a token type part comprising a plurality of fixed-length entries for storing token type information for all tokens in the session initiation protocol message, wherein the token type part includes one of a value and a pointer to associated token content, and a token content part comprising a plurality of variable-length entries for storing token contents and a length value for the token contents; and
   processing the session initiation protocol offload engine message at the server end, whereby different token content of the SOE message can be identified by token types for selective processing.

16. A system for processing session initiation (SIP) protocol messages, comprising:
   a message input component for receiving an SIP message;
   a message parser for parsing the SIP message to transform tokens contained in the SIP message into token type entries and token content entries, whereby token type entries and token content entries for all tokens in the session initiation protocol message are grouped respectively and stored separately, and corresponding links comprising pointers are set up between the token type entries and the token content entries, whereby the session initiation protocol message, after parsing, is transformed to a session initiation protocol offload engine (SOE) message comprising at least a session initiation protocol offload engine message header part for storing message level information, a token type part comprising a plurality of fixed-length entries for storing token type information for all tokens in the session initiation protocol message, wherein the token type part includes one of a value and a pointer to associated token content, and a token content part comprising a plurality of variable-length entries for storing token contents and a length value for the token contents; and
   an SOE message communicating component for sending the SOE message for message processing whereby different token content of the SOE message can be identified by token types for selective processing.

* * * * *